US012591440B2

(12) United States Patent
An et al.

(10) Patent No.: US 12,591,440 B2
(45) Date of Patent: Mar. 31, 2026

(54) BMC DEVICE COMPONENT IDENTIFICATION INFORMATION RETRIEVAL/PROVISIONING SYSTEM

(71) Applicant: Dell Products L.P., Round Rock, TX (US)

(72) Inventors: Rui An, Austin, TX (US); Chandrasekhar Mugunda, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 18/746,422

(22) Filed: Jun. 18, 2024

(65) Prior Publication Data

US 2025/0383887 A1 Dec. 18, 2025

(51) Int. Cl.
*G06F 9/445* (2018.01)
(52) U.S. Cl.
CPC ................................ *G06F 9/44505* (2013.01)
(58) Field of Classification Search
CPC ................................................. G06F 9/44505
USPC ............................................................ 713/1
See application file for complete search history.

(56) References Cited

PUBLICATIONS

NVIDIA "Using the Baseboard Management Controller (BMC)," NVIDIA DGX Systems, NVIDIA Corporation, 16 pages, https://docs.nvidia.com/dgx/dgxh100-user-guide/bmc.html.

*Primary Examiner* — Paul R. Myers
(74) *Attorney, Agent, or Firm* — Joseph Mencher

(57) ABSTRACT

A Baseboard Management Controller (BMC) device component identification information retrieval/provisioning system includes a chassis housing host component(s), device component(s), and a BMC device. The BMC device includes a host management subsystem that is connected to each of the host component(s) via a host communication interface, and a device management subsystem that is connected to the device component(s) via a device communication interface that is not accessible by the host management subsystem. The device management subsystem retrieves device component identification information from each of the device component(s) via the device communication interface, and provides the device component identification information to the host management subsystem. The host management subsystem retrieves host component identification information from each of the host component(s) via the host communication interface, and provides the device component identification information and the host component identification information for management operations.

20 Claims, 6 Drawing Sheets

300

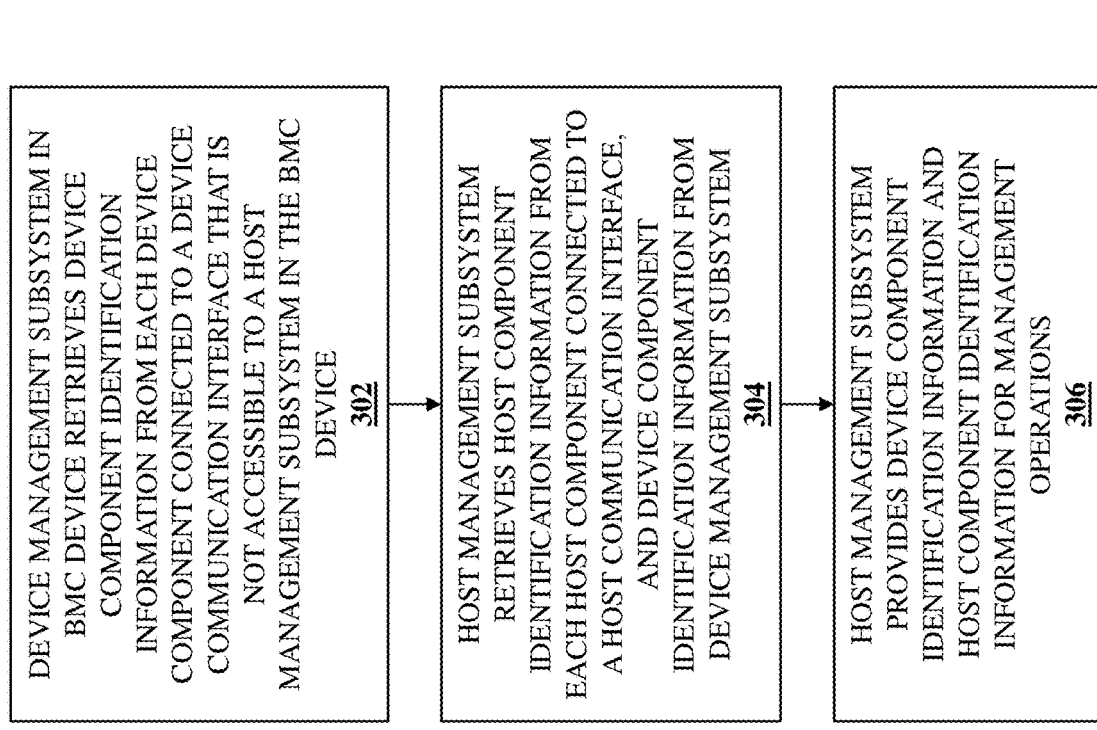

DEVICE MANAGEMENT SUBSYSTEM IN BMC DEVICE RETRIEVES DEVICE COMPONENT IDENTIFICATION INFORMATION FROM EACH DEVICE COMPONENT CONNECTED TO A DEVICE COMMUNICATION INTERFACE THAT IS NOT ACCESSIBLE TO A HOST MANAGEMENT SUBSYSTEM IN THE BMC DEVICE
302

HOST MANAGEMENT SUBSYSTEM RETRIEVES HOST COMPONENT IDENTIFICATION INFORMATION FROM EACH HOST COMPONENT CONNECTED TO A HOST COMMUNICATION INTERFACE, AND DEVICE COMPONENT IDENTIFICATION INFORMATION FROM DEVICE MANAGEMENT SUBSYSTEM
304

HOST MANAGEMENT SUBSYSTEM PROVIDES DEVICE COMPONENT IDENTIFICATION INFORMATION AND HOST COMPONENT IDENTIFICATION INFORMATION FOR MANAGEMENT OPERATIONS
306

FIG. 3

BMC DEVICE COMPONENT IDENTIFICATION INFORMATION RETRIEVAL/PROVISIONING SYSTEM

BACKGROUND

The present disclosure relates generally to information handling systems, and more particularly to retrieving and provisioning device component identification information using a Baseboard Management Controller (BMC) device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include a Baseboard Management Controller (BMC) device such as the integrated DELL® Remote Access Controller (IDRAC) available in server devices provided by DELL® Inc. of Round Rock, Texas, United States that provides an out-of-band management platform that uses resources that are mostly separate from the server device to provide a browser-based Graphical User Interface (GUI) or text-based Command-Line Interface (CLI) for managing and monitoring hardware in the server device. Such management and monitoring is conventionally enabled by the BMC device via an Inter-Integrated Circuit (I2C) bus connected to known "host" components in the "host"/server device, and involves the BMC device using an underlying I2C driver to "walk through" the I2C bus and retrieve Field Replaceable Unit (FRU) information (e.g., serial numbers, part numbers, model names, etc.) and/or other host component identification information stored in the host components. The BMC device may then provide that host component identification information in corresponding data objects for consumption via inventory consumer applications, user interfaces (e.g., the browser-based GUIs and/or text-based CLIs discussed above), and/or other BMC subsystems known in the art.

However, server configurations have begun to introduce devices into the server devices that raises issues with the management and monitoring by the BMC device discussed above. For example, recent Artificial Intelligence/Machine Learning (AI/ML) server configurations include multi-Graphics Processing Unit (GPU) devices that are available from NVIDIA® Corporation of Santa Clara, California, United States; AMD® Inc. of Santa Clara, California, United States; and INTEL® Corporation of Santa Clara, California, United States, and that may include a plurality of device components such as GPUs, Field Programmable Gate Arrays (FPGAs), Peripheral Component Interconnect express (PCIe) re-timers, switches, and/or other device components known in the art. In such multi-GPU devices, a multi-GPU device controller is provided in the multi-GPU device for use in consolidating and managing data from the device components in the multi-GPU device, and that multi-GPU device controller is configured to utilize a unified management path provided by a Universal Serial Bus-Network Interface Controller (USB-NIC) interface.

However, as described above, conventional BMC devices are configured to retrieve identification information for host components via an I2C interface, and thus will not be able to retrieve similar identification information for the device components in the multi-GPU device using the techniques described above. As will be appreciated by one of skill in the art in possession of the present disclosure, the inability to retrieve FRU information and/or other identification information for the device components in multi-GPU devices will prevent the management and monitoring of device components in multi-GPU devices that provide the AI/ML server configurations described above.

Accordingly, it would be desirable to provide a BMC device identification information retrieval/provisioning system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the BMC processing system to provide a BMC engine that includes: a host management sub-engine that is connected to at least one host component via a host communication interface; and a device management sub-engine that is connected to at least one device component via a device communication interface that is not accessible by the host management sub-engine, wherein the device management sub-engine is configured to: retrieve device component identification information from each of the at least one device component via the device component communication interface; and provide the device component identification information to the host management sub-engine, and wherein the host management sub-engine is configured to: retrieve host component identification information from each of the at least one host component via the host communication interface; and provide the device component identification information and the host component identification information for management operations.

BRIEF DESCRIPTION OF THE DRAWINGS

FIG. 3 is a flow chart illustrating an embodiment of a method for retrieving and provisioning device component identification information using a BMC device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
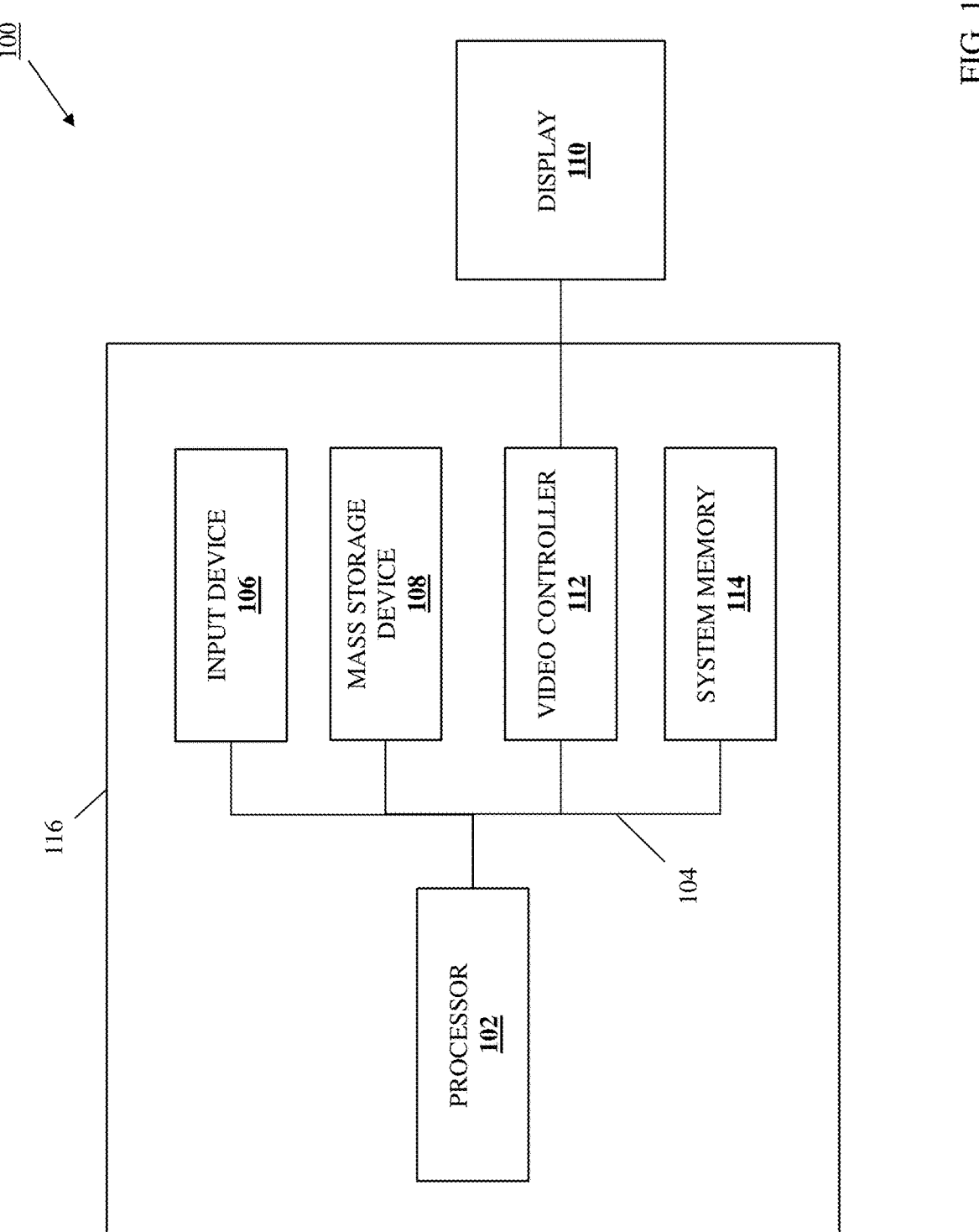
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
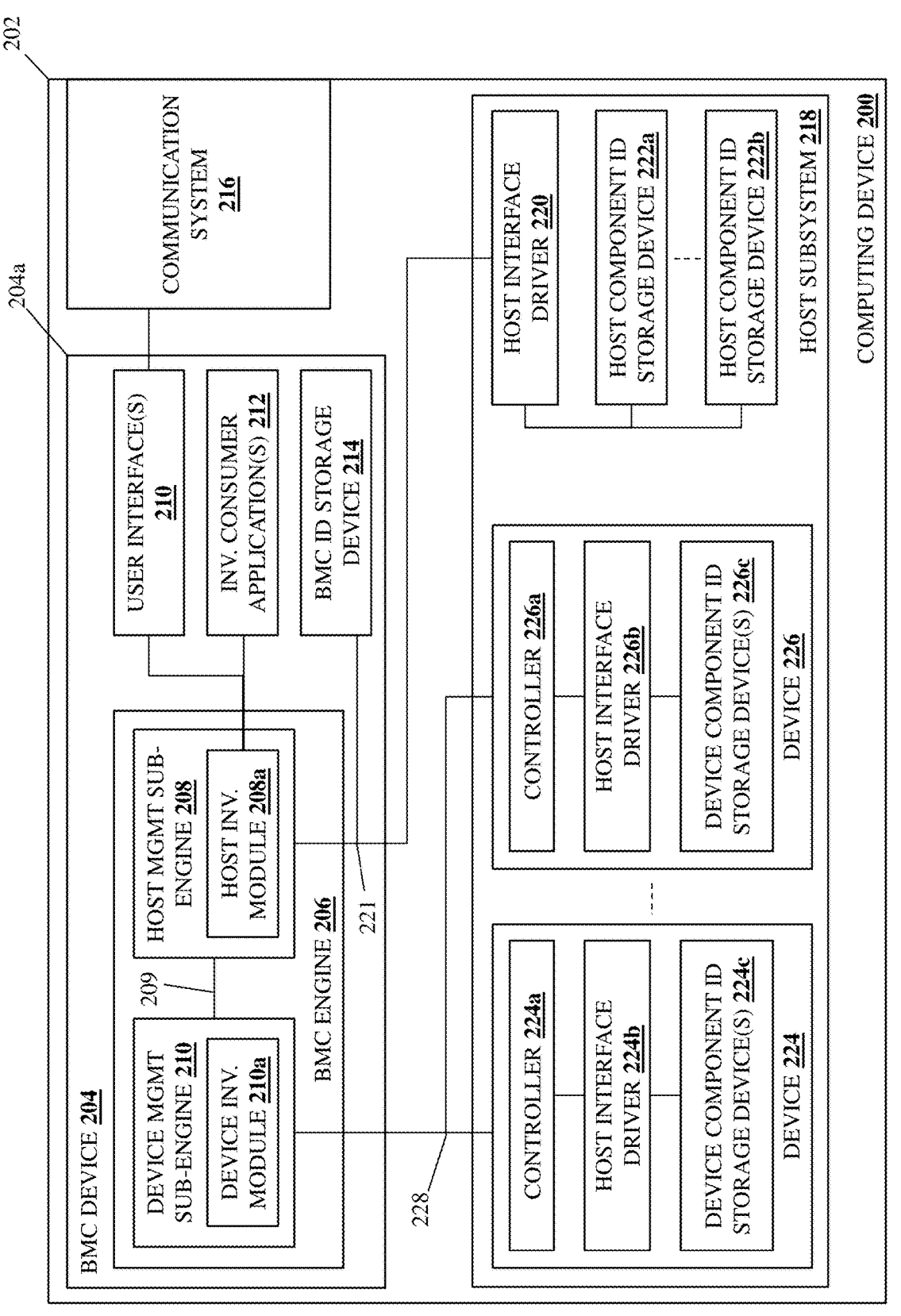
FIG. 2 is a schematic view illustrating an embodiment of a computing device that may include the BMC device component identification information retrieval/provisioning system of the present disclosure.

Referring now to FIG. 2, an embodiment of a computing device 200 is illustrated that may include the BMC device component identification information retrieval/provisioning system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other computing devices that are configured to operate similarly as the computing device 200 discussed below.

In the illustrated embodiment, the computing device 200 includes a chassis 202 that houses the components of the computing device 200, only some of which are illustrated and described below. For example, the chassis 302 may house a BMC device 204 that may be provided according to the "OpenBMC" project (a Linux Foundation open-source project for BMCs), by the integrated DELL® Remote Access Controller (IDRAC) available in server devices provided by DELL® Inc. of Round Rock, Texas, United States, as well as any using any other BMC devices that would be apparent to one of skill in the art in possession of the present disclosure. As such, the BMC device 204 may be configured to provide an out-of-band management platform that uses resources that are mostly separate from the computing device 200 to provide a browser-based GUI or text-based CLI for managing and monitoring hardware in the computing device 200.

In the illustrated embodiment, the BMC device 204 includes a chassis 204*a* (e.g., a circuit board) that supports the components of the BMC device 204, only some of which are illustrated and described below. For example, the chassis 204*a* of the BMC device 204 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 206 that is configured to perform the functionality of the BMC engines and/or BMC devices discussed below.

In the embodiments illustrated and described below, the BMC engine 206 includes a host management sub-engine 208 having a host inventory module 208*a* (e.g., an "entity manager" having an "FRU device daemon" for BMC devices provided according to the OpenBMC project discussed above; or a shared memory subsystem and an Intelligent Platform Management Interface (IPMI) daemon (e.g., an "impid") having an "FRU module" for BMC devices provided by the iDRAC discussed above). The host management sub-engine 208 may be provided by a host management processing subsystem and a host management memory subsystem that is coupled to the host management processing subsystem and that includes instructions that, when executed by the host management processing subsystem, cause the host management processing subsystem to provide the host management sub-engine 208 and host inventory module 208*a* that are configured to perform the functionality of the host management sub-engines, host inventory modules, and/or BMC devices discussed below. As such, the host management processing subsystem and the host management memory subsystem may be part of (or included in) the BMC processing system and BMC memory system described above.

In the embodiments illustrated and described below, the BMC engine 206 also includes a device management sub-engine 210 having a device inventory module 210a that one of skill in the art in possession of the present disclosure will appreciate may be provided according to the teachings described herein to enable the BMC device component identification information retrieval/provisioning functionality discussed below. In a specific example in which the device management sub-engine 210/device inventory module 210a are provided for the management of a multi-GPU device like those described above, the device management sub-engine 210 and device inventory module 210a may be provided by a "GPU baseboard management daemon" having a "GPU baseboard FRU module", although the management of other devices will fall within the scope of the present disclosure as well.

The device management sub-engine 210 may be provided by a device management processing subsystem and a device management memory subsystem that is coupled to the device management processing subsystem and that includes instructions that, when executed by the device management processing subsystem, cause the device management processing subsystem to provide the device management sub-engine 210 and device inventory module 210a that are configured to perform the functionality of the device management sub-engines, device inventory modules, and/or BMC devices discussed below. As such, the device management processing subsystem and the device management memory subsystem may be part of (or included in) the BMC processing system and BMC memory system described above (e.g., the device inventory module 210a and the host inventory module 208a may be respective processes running on the BMC device 204). In the specific examples provided below, the device management sub-engine 210/device inventory module 210a may be configured to provide a Redfish client, USB-NIC drivers, and/or any other device communication functionality that one of skill in the art in possession of the present disclosure would recognize as enabling the device communications via Redfish and the USB-NIC interface described below.

As illustrated, the device management sub-engine 210 may be connected to the host management sub-engine 208 by a host communication interface 209 that, in the examples described below, is provided by an intra-process interface. For example, the device management sub-engine 210 and the host management sub-engine 208 may be provided by respective processes provide by the BMC processing system that are connected by any of a variety of process interfaces known in the art, although other processing subsystems connected by other host communication interfaces are envisioned as falling within the scope of the present disclosure as well.

As illustrated, the chassis 204a of the BMC device 204 may also support one or more user interfaces 210 that are coupled to the host inventory module 208a in the host management sub-engine 208 of the BMC engine 206 (e.g., via coupling(s) between the user interface(s) 210 and the host management processing subsystem in the BMC processing system), and one of skill in the art in possession of the present disclosure will appreciate how the user interface (s) 210 may be provided by any user interfaces (e.g., the browser-based GUIs and text-based CLIs discussed above) known in the art. In a specific example for BMC devices provided according to the OpenBMC project discussed above, the user interface(s) 210 may be provided by a Redfish interface and/or GUI that is connected by a D-bus to the host inventory module 208a, although other user interfaces and/or user interface connections are envisioned as falling within the scope of the present disclosure as well.

The chassis 204a of the BMC device 204 may also support one or more inventory consumer applications 212 that are configured to consume any of the inventory information (e.g., the host component identification information and the device component identification information) described below, and while the inventory consumer application(s) 212 are illustrated and described as being located outside of the BMC engine 206, one of skill in the art in possession of the present disclosure will appreciate how those inventory consumer application(s) 212 may be provided by the BMC engine 206 while remaining within the scope of the present disclosure as well. In a specific example for BMC devices provided according to the OpenBMC project discussed above, the inventory consumer application (s) 212 may be provided by a "thermald" Linux daemon connected via the D-bus discussed above to the host inventory daemon 208a and configured to monitor and control temperatures, an "mctpd" daemon connected via the D-bus discussed above to the host inventory daemon 208a and configured to implement the Management Control Transport Protocol (MCTP) to assign Endpoint IDentifiers (EIDs) to endpoints and manage the resulting routes and neighbor-table entries for those endpoints, and a "powerd" daemon connected via the D-bus discussed above to the host inventory module 208a and configured to manage power, although other inventory consumer applications and/or inventory consumer application connections are envisioned as falling within the scope of the present disclosure as well.

In another example, in BMC devices provided by the iDRAC discussed above, the inventory consumer application(s) 212 may be provided by populators (e.g., an environmental populator (e.g., "IENV POP"), a hardware inventory populator (e.g., "HWInv Pop"), a Human Interface Infrastructure populator (e.g., "HII Pop"), and a Directory Central Processing Unit populator (e.g., "dcpupop")) that populate the inventory information (e.g., the host component identification information and the device component identification information) described below in management databases (as FRU objects in a table (e.g., "TblFRUObj")) for by the user interface(s) 210 that may be provided by a Redfish interface and/or GUI similarly as discussed above, a Remote Access Controller ADMinistrator (RACADM) user interface, a telemetry data user interface, and/or other user interfaces that would be apparent to one of skill in the art in possession of the present disclosure. However, while specific implementations of the BMC devices used in the BMC device component identification information retrieval/provisioning system of the present disclosure have been illustrated and described, one of skill in the art in possession of the present disclosure will appreciate how other BMC devices will benefit from the teachings of the present disclosure and thus will fall within its scope as well.

In the embodiments illustrated and described below, the chassis 204a of the BMC device 204 also supports a BMC identifier storage device 214 that may be provided by a memory device (e.g., an Electronically Erasable Programmable Read Only Memory (EEPROM) device) and that may store BMC identification information (e.g., a "baseboard FRU") that may include any information that one of skill in the art in possession of the present disclosure would recognize as identifying the BMC device 204. As illustrated, the BMC identification storage device 214 may be coupled to the host inventory module 208a in the host management sub-engine 208 of the BMC engine 206 (e.g., via a coupling between the BMC identification storage device 214 and the host management processing subsystem in the BMC processing system).

The chassis 202 of the computing device 200 may also house a communication system 216 that is coupled to the user interface(s) 210 on the BMC device 204, and that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize as provided for the management communications by the BMC device 204 described below. Furthermore, while illustrated as being provided separately from the BMC device 204, one of skill in the art in possession of the present disclosure will appreciate how the communication system 216 may be provided on the BMC device 204 while remaining within the scope of the present disclosure as well.

The chassis 202 of the computing device 200 may also house a host subsystem 218 that one of skill in the art in possession of the present disclosure will appreciate may include any of a variety of host components (e.g., processing systems, memory systems, networking systems, storage systems, etc.) that are not illustrated for clarity. As illustrated, the host subsystem 218 includes a host interface driver 220 that is coupled to the host inventory module 208*a* in the host management sub-engine 208 of the BMC engine 206 in the BMC device 204 by a host communication interface 221 (e.g., via the host communication interface 221 extending between a controller or other processor providing the host interface driver 220 and the host management processing subsystem in the BMC processing system). In the specific examples below, the host communication interface 221 is provided by an I2C interface and the host interface driver 220 is provided by an I2C driver, although other host communication interfaces are envisioned as falling within the scope of the present disclosure. In some embodiments, the host communication interface 209 and the host communication interface 221 may be provided by the same host interface bus (e.g., an I2C bus connected to the host management processing subsystem in the BMC processing system), although different host communication interfaces will fall within the scope of the present disclosure as well.

As illustrated, the host interface driver 220 may be coupled to host component identification storage devices 222*a* and up to 222*b* that may be provided by respective memory devices (e.g., EEPROM devices) in the host components described above, and that may store host component identification information (e.g., "FRU information") that may include any information that one of skill in the art in possession of the present disclosure would recognize as identifying the host components in the host subsystem 218. As will be appreciated by one of skill in the art in possession of the present disclosure, the host communication interface 221 and host interface driver 220 provide for the conventional retrieval of host component identification information from host components via their host component identification storage devices 222*a*-222*b* by the BMC engine 206 (i.e., the host inventory module 208*a* in the host management sub-engine 208), and thus "host components" as used herein may refers to any devices, subsystems, and/or other components in the computing device 200 that allow access to their FRU/identification information by the BMC device 204 via the conventional host communication interface (e.g., the I2C interface) described above.

However, as also illustrated in FIG. 2, the host subsystem 218 may also include a plurality of devices 224 and up to 226, each of which is coupled to the device inventory module 210*a* in the device management sub-engine 210 of the BMC engine 206 in the BMC device 204 by a device communication interface 228 (e.g., via the device communication interface 228 extending between each of the devices 224-226 and the host management processing subsystem in the BMC processing system). As can be seen in FIG. 2, the device communication interface 228 is not accessible by the host management sub-engine 208 of the BMC engine 206 in the BMC device 204. For example, the device communication interface 228 may not be connected to the host management processing subsystem in the BMC processing system, although other configurations of the device communication interface 228 that prevent access by the host management sub-engine 208 will fall within the scope of the present disclosure as well.

In the specific examples below, the device communication interface 228 is provided by a NIC-USB interface, although other device communication interfaces are envisioned as falling within the scope of the present disclosure. As will be appreciated by one of skill in the art in possession of the present disclosure, each of the devices 224-226 may include one or more device components, with the device 224 including a controller 224*a* coupled to a host interface driver 224*b* that is coupled to a respective device component identification storage device 224*c* (e.g., an EEPROM) that is included in each of the device component(s) in the device 224, and the device 226 including a controller 226*a* coupled to a host interface driver 226*b* that is coupled to a respective device component identification storage device 226*c* (e.g., an EEPROM) that is included in each of the device component (s) in the device 226.

As discussed above, the device 224 may be provided by a multi-GPU device that includes a plurality of device components that are provided the GPUs, FPGAs, PCIe re-timers, switches, and/or other multi-GPU device components that would be apparent to one of skill in the art in possession of the present disclosure, although other types of devices (e.g., as represented by the device 226) having other device components will fall within the scope of the present disclosure as well. In the specific examples provided below, the host interface drivers 224*b* and 226*b* are provided by I2C drivers, although other host interface drivers will fall within the scope of the present disclosure as well.

As discussed in further detail below, the device communication interface 228 provides for the retrieval of device component identification information from device components in the devices 224-226 via their device component identification storage devices 224*c*-226*c* by the BMC engine 206 (i.e., the device inventory module 210*a* in the device management sub-engine 210) according to the teachings of the present disclosure, and thus "device components" as used herein may refers to any devices, subsystems, and/or other components in the computing device 200 that allow access to their FRU/identification information by the BMC device 204 via the device communication interface (e.g., the USB-NIC interface) provided according to the teachings of the present disclosure.

However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the BMC device component identification information retrieval/provisioning functionality discussed below, while remaining within the scope of the present disclosure as well.

Referring now to FIG. 3, an embodiment of a method 300 for retrieving and provisioning device component identification information using a Baseboard Management Controller (BMC) device is illustrated. As discussed below, the systems and methods of the present disclosure provide a device management subsystem in BMC devices to retrieve device component identification information from device components connected to a device communication interface that is not accessible to a host management subsystem in that BMC device that retrieves host component identification information from host components via a conventional host communication interface. For example, the BMC device component identification information retrieval/provisioning system includes a chassis housing at least one host component, at least one device component, and a BMC device. The BMC device includes a host management subsystem that is connected to each of the at least one host component via a host communication interface, and a device management subsystem that is connected to the at least one device component via a device communication interface that is not accessible by the host management subsystem. The device management subsystem retrieves device component identification information from each of the at least one device component via the device communication interface, and provides the device component identification information to the host management subsystem. The host management subsystem retrieves host component identification information from each of the at least one host component via the host communication interface, and provides the device component identification information and the host component identification information for management operations. As such, devices and device components that are not accessible via a conventional host communication interface may have their device component identification information retrieved for use in management operations via the BMC device.

Figure 4:
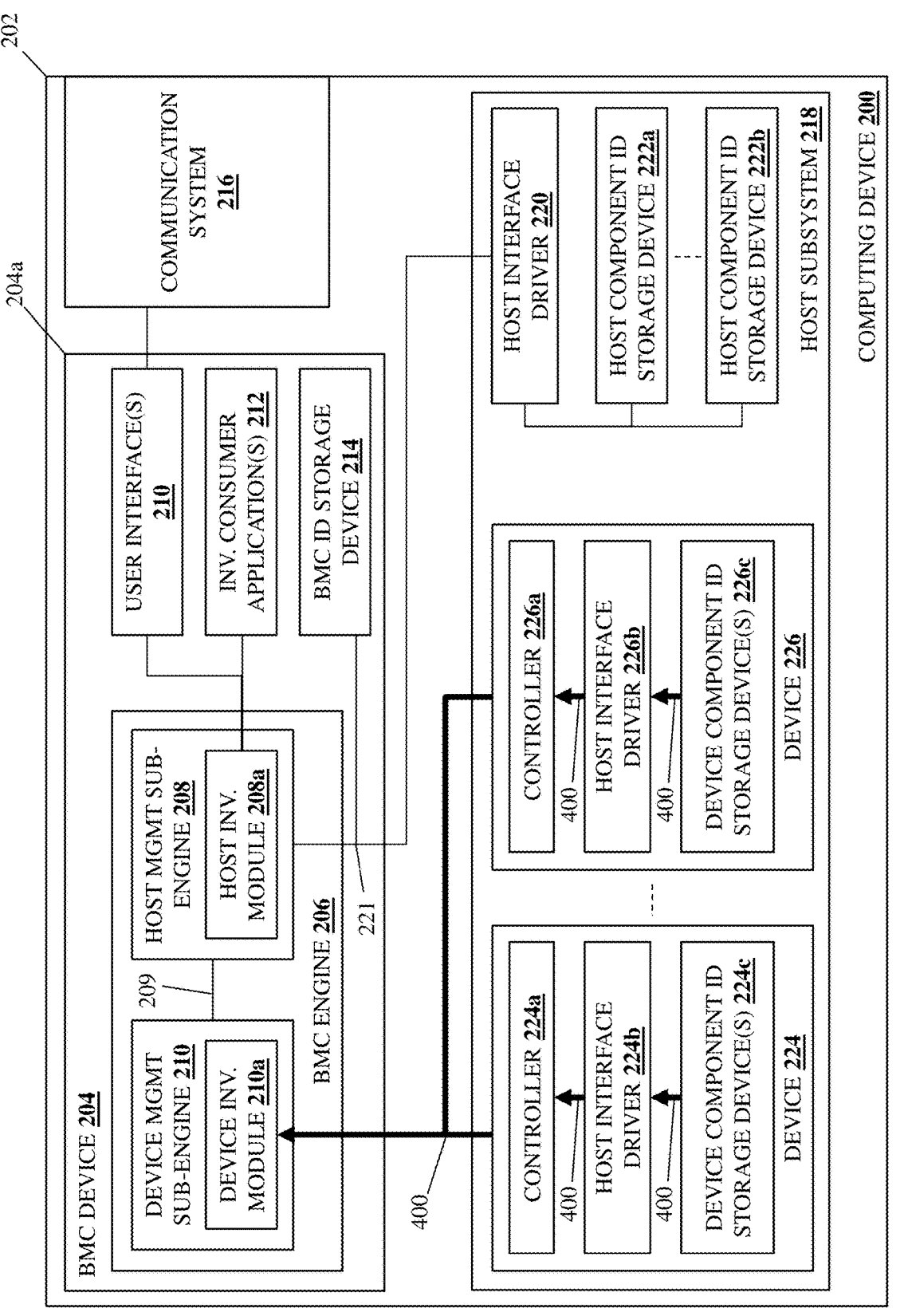
FIG. 4 is a schematic view illustrating an embodiment of the computing device of FIG. 2 operating during the method of FIG. 3.

The method 300 begins at block 302 where a device management subsystem in a BMC device retrieves device component identification information from each device component connected to a device communication interface that is not accessible to a host management subsystem in the BMC device. With reference to FIG. 4, in an embodiment of block 302, the device inventory module 210a in the device management sub-engine 210 of the BMC engine 206 in the BMC device 204 may perform device component identification information retrieval operations 400 that may include the device inventory module 210a retrieving device component identification information from each of the device component identification storage device(s) 224c in the device 224 (i.e., from each device component in the device 224) via the device communication interface 228 and the controller 224a in the device 224 (using the host interface driver 224b), and retrieving device component identification information from each of the device component identification storage device(s) 226c in the device 226 (i.e., from each device component in the device 226) via the device communication interface 228 and the controller 226a in the device 226 (using the host interface driver 226b).

In some embodiments, the device inventory module 210a may utilize Redfish over the USB-NIC interface provided by the device communication interface 228 to retrieve FRU information that provides the device component identification information stored in each of the device component identification storage devices 224c and 226c and that was previously retrieved by the controllers 224a and 226a, respectively, using the I2C drivers provided by their respective host interface drivers 224b and 226b.

For example, the controller 224a in the device 224 may use its I2C driver that provides the host interface driver 224b to read "raw" GPU, Operations/Administration/Management (OAM), and/or other FRU data from each of the device component identification storage device(s) 224c, respectively, may provide the FRU data retrieved for each device component (e.g., each GPU in the multi-GPU device that provides the device 224) in a binary file, and may store that binary file in association with a Redfish Universal Resource Identifier (URI) provided for that device component (e.g., a Redfish URI provided for a GPU number or other GPU identifier for each GPU). As such, upon any power-on, reset, or other initialization of the computing device 200 and/or the BMC device 204, the device management sub-engine 210 of the BMC engine 206 in the BMC device 204 may identify each Redfish URI having a binary file including the FRU data discussed above, and use that Redfish URI to retrieve and store that FRU data (e.g., as a binary file (e.g., "/etc/fru/gpu<x>.fru.bin") when the BMC device 204 is provided according to the OpenBMC project discussed above, or in a GPU shared memory device when the BMC device 204 is provided by the iDRAC discussed above). As will be appreciated by one of skill in the art in possession of the present disclosure, the device inventory module 210a may then expose that FRU data to the host inventory module 208a in the host management sub-engine 208 of the BMC engine 206 provided by the BMC device 204 via an I2C interface that provides the host communication interface 209.

Figure 5:
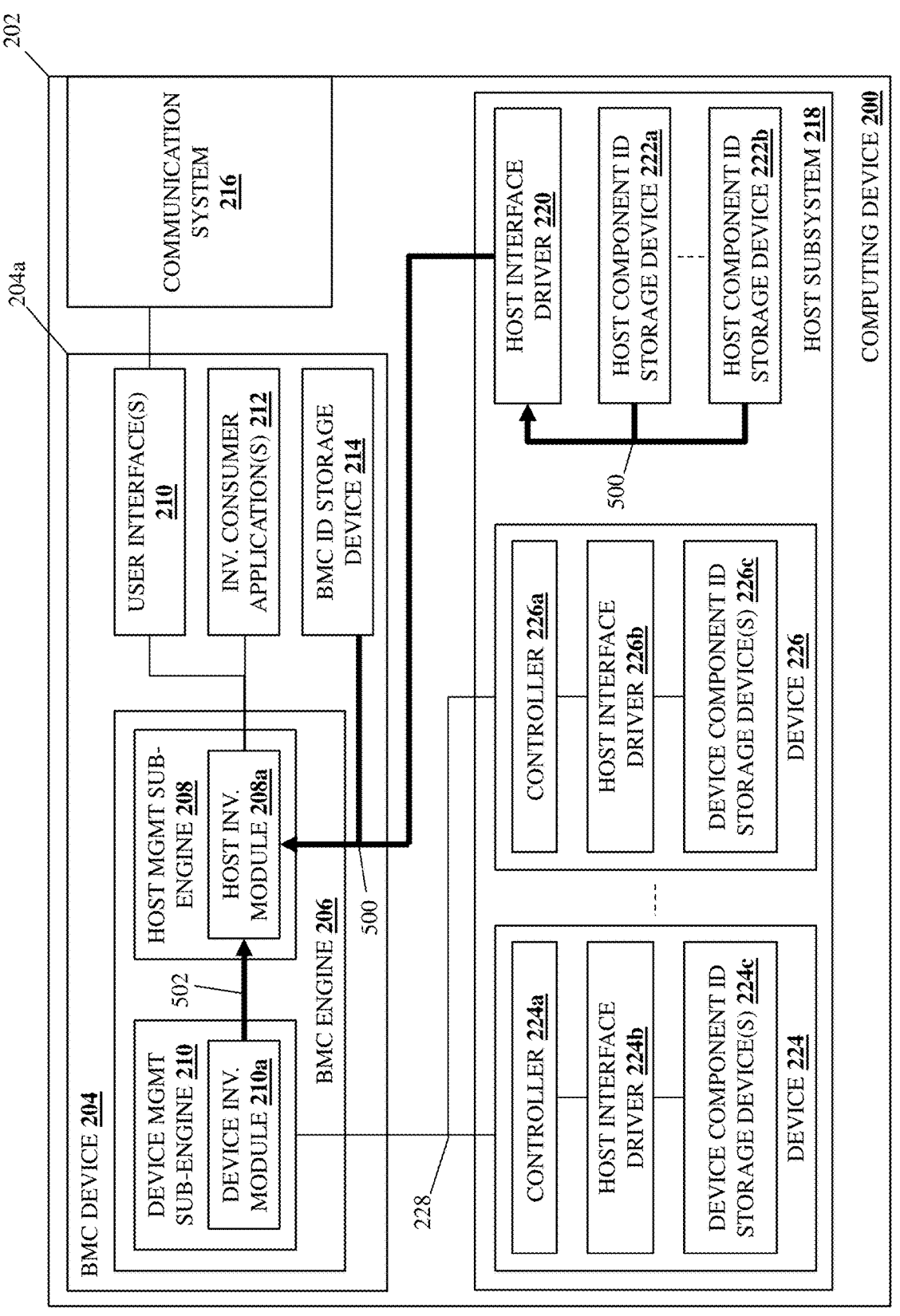
FIG. 5 is a schematic view illustrating an embodiment of the computing device of FIG. 2 operating during the method of FIG. 3.

The method 300 then proceeds to block 304 where the host management subsystem retrieves host component identification information from each host component connected to a host communication interface, and the device component identification information from the device management subsystem. With reference to FIG. 5, in an embodiment of block 304, the host inventory module 208a in the host management sub-engine 208 of the BMC engine 206 in the BMC device 204 may perform host component identification information retrieval operations 500 that may include the host inventory module 208a retrieving host component identification information from each of the host component identification storage device(s) 222a-222b in the host subsystem 218 (i.e., from each host component in the host subsystem 218) via the host communication interface 221 (using the host interface driver 220), and retrieving BMC identification information from the BMC identification storage device 214 via the host communication interface 221 as well. As such, in some embodiments, the host inventory module 208a may utilize conventional I2C communication techniques with the I2C interface provided by the host communication interface 221 to retrieve FRU information that provides the BMC identification information stored in the BMC identification storage device 214 and the host component identification information stored in each of the host component identification storage devices 222a-222b (i.e., using the I2C driver provided by the host interface driver 220).

Furthermore, in an embodiment of block 304, the host inventory module 208a in the host management sub-engine 208 of the BMC engine 206 in the BMC device 204 may perform device component identification information retrieval operations 502 that may include the host inventory module 208a retrieving device component identification information exposed by the device inventory module 210a in the device management sub-engine 210 of the BMC engine 206 in the BMC device 204 as described above. As such, in some embodiments the host inventory module 208*a* may utilize conventional I2C communication techniques with the I2C interface provided by the host communication interface 209 to retrieve FRU information that provides the device component identification information that is exposed by the device inventory module 210*a* after its retrieval from each of the device component identification storage devices 224*c*-226*c* in the devices 224-226, respectively, as described above.

Figure 6:
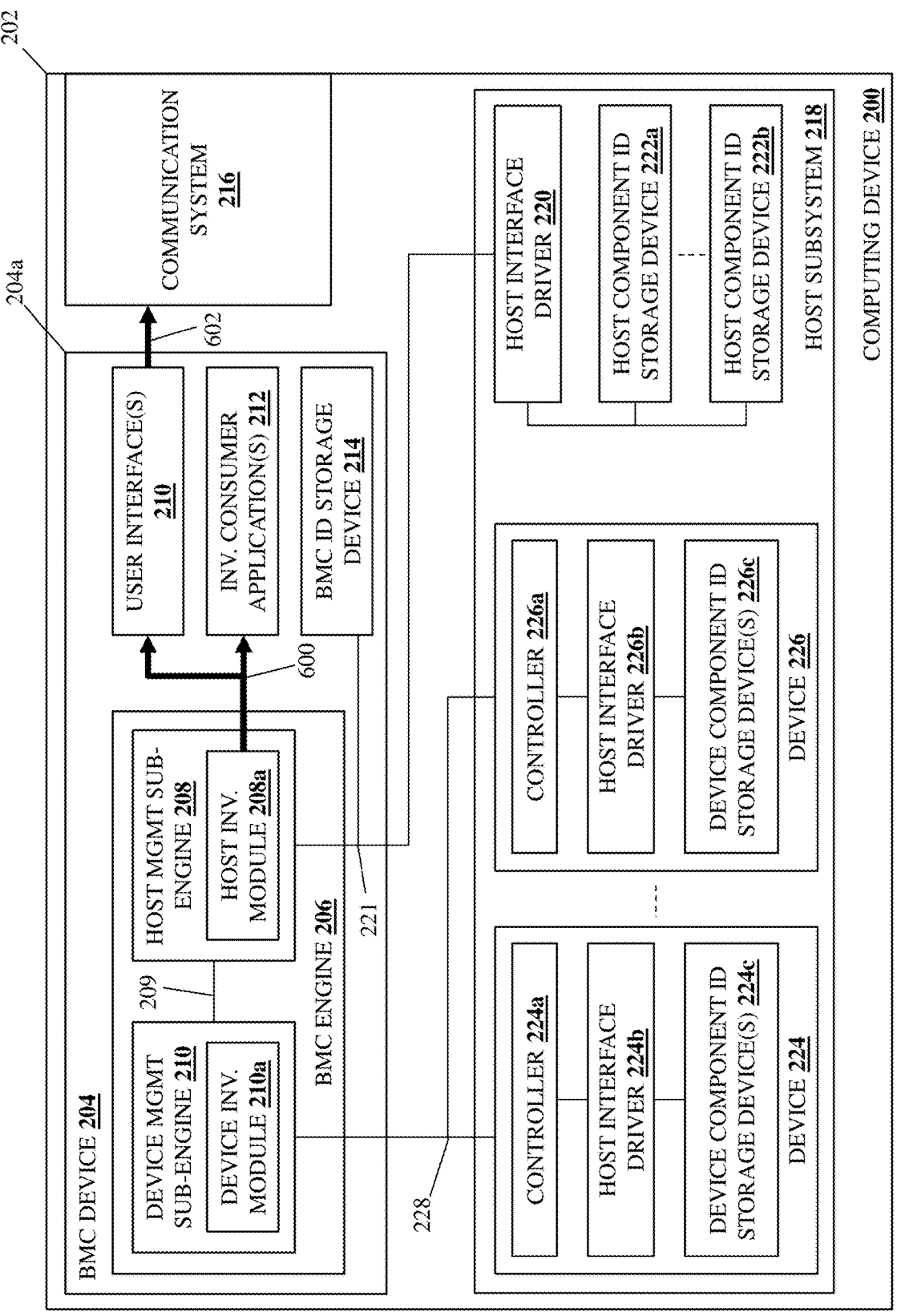
FIG. 6 is a schematic view illustrating an embodiment of the computing device of FIG. 2 operating during the method of FIG. 3.

The method 300 then proceeds to block 306 where the host management subsystem provides the device component identification information and the host component identification information for management operations. With reference to FIG. 6, in an embodiment of block 306, the host inventory module 208*a* in the host management sub-engine 208 of the BMC engine 206 in the BMC device 204 may perform host component identification information/device component identification information provisioning operations 600 that may include providing the host component identification information and the device component identification information retrieved at block 304 to the inventory consumer application(s) 212 and the user interface(s) 210 for use in management operations. As will be appreciated by one of skill in the art in possession of the present disclosure, the provisioning of the host component identification information and the device component identification information by the host inventory module 208*a* at block 306 may include the exposure of the FRU information for host components and device components included in the devices 224-226 in the host subsystem 218 via any conventional management frameworks used for inventory monitoring while remaining within the scope of the present disclosure.

As such, the user interface(s) 210 may perform management operations 602 (in some cases in cooperation with the inventory consumer application(s) 212) that may include the use of the host component identification information and the device component identification information to generate management information and transmit that management information via the communication system 216, or that may include the transmission of the host component identification information and the device identification information via the communication system 216, or that may include any other management operations that would be apparent to one of skill in the art in possession of the present disclosure. Continuing with the specific examples provided above, the device component identification information may be utilized by the inventory consumer applications to inventory the device components (e.g., GPUs, FPGAs, PCIe re-timers, switches, etc.) on a multi-GPU device that provides the device 224, and then manage those device components, allow for the monitoring of those device components via the communication system (e.g., via the browser-based GUIs, text-based CLIs, and/or other user interfaces described above), and/or perform any of a variety of other BMC functionality that would be apparent to one of skill in the art in possession of the present disclosure.

Thus, systems and methods have been described that provide a device management subsystem in BMC devices to retrieve device component identification information from devices connected to a device communication interface that is not accessible to a host management subsystem in that BMC device that retrieves host component identification information from host components via a conventional host communication interface. For example, the BMC device component identification information retrieval/provisioning system includes a chassis housing at least one host component, at least one device component, and a BMC device. The BMC device includes a host management subsystem that is connected to each of the at least one host component via a host communication interface, and a device management subsystem that is connected to the at least one device component via a device communication interface that is not accessible by the host management subsystem. The device management subsystem retrieves device component identification information from each of the at least one device component via the device communication interface, and provides the device component identification information to the host management subsystem. The host management subsystem retrieves host component identification information from each of the at least one host component via the host communication interface, and provides the device component identification information and the host component identification information for management operations. As such, devices and device components that are not accessible via a conventional host communication interface may have their device component identification information retrieved for use in management operations via the BMC device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC) device component identification information retrieval/provisioning system, comprising:
   a chassis;
   at least one host component that is housed in the chassis;
   at least one device component that is housed in the chassis; and
   a Baseboard Management Controller (BMC) device that is housed in the chassis and that includes:
      a host management subsystem that is connected to each of the at least one host component via a host communication interface; and
      a device management subsystem that is connected to the at least one device component via a device communication interface that is not accessible by the host management subsystem,
      wherein the device management subsystem is configured to:
         retrieve device component identification information from each of the at least one device component via the device communication interface; and
         provide the device component identification information to the host management subsystem, and
      wherein the host management subsystem is configured to:
         retrieve host component identification information from each of the at least one host component via the host communication interface; and
         provide the device component identification information and the host component identification information for management operations.

2. The system of claim 1, wherein the host communication interface is an Inter-Integrated Circuit (I2C) interface, and the device communication interface is a Universal Serial Bus—Network Interface Controller (USB-NIC) interface.

3. The system of claim 1, wherein the host component identification information and the device component identification information are each provided by Field Replaceable Unit (FRU) information.

4. The system of claim 1, wherein the at least one device includes a plurality of Graphics Processing Units (GPUs) that are included on a circuit board.

5. The system of claim 4, wherein the device management subsystem is configured to:

retrieve the device component identification information from each of the plurality of GPUs via the device communication interface and from a controller that is included on the circuit board and coupled to each of the plurality of GPUs.

6. The system of claim 1, wherein the BMC device includes:

at least one inventory consumer application that is configured to perform the management operations using the device component identification information and the host component identification information.

7. An Information Handling System (IHS), comprising:

a Baseboard Management Controller (BMC) processing system; and a BMC memory system that is coupled to the BMC processing system and that includes instructions that, when executed by the BMC processing system, cause the BMC processing system to provide a BMC engine that includes:

a host management sub-engine that is connected to at least one host component via a host communication interface; and a device management sub-engine that is connected to at least one device component via a device communication interface that is not accessible by the host management sub-engine, wherein the device management sub-engine is configured to:

retrieve device component identification information from each of the at least one device component via the device communication interface; and provide the device component identification information to the host management sub-engine, and wherein the host management sub-engine is configured to:

retrieve host component identification information from each of the at least one host component via the host communication interface; and provide the device component identification information and the host component identification information for management operations.

8. The IHS of claim 7, wherein the host communication interface is an Inter-Integrated Circuit (I2C) interface, and the device communication interface is a Universal Serial Bus-Network Interface Controller (USB-NIC) interface.

9. The IHS of claim 7, wherein the host component identification information and the device component identification information are each provided by Field Replaceable Unit (FRU) information.

10. The IHS of claim 7, wherein the at least one device component includes a plurality of Graphics Processing Units (GPUs) that are included on a circuit board.

11. The IHS of claim 10, wherein the device management sub-engine is configured to:

retrieve the device component identification information from each of the plurality of GPUs via the device communication interface and from a controller that is included on the circuit board and coupled to each of the plurality of GPUs.

12. The IHS of claim 7, wherein the host management sub-engine is configured to:

provide the device component identification information and the host component identification information to at least one inventory consumer application for use in performing the management operations.

13. The IHS of claim 7, wherein the host management sub-engine is configured to:

provide the device component identification information and the host component identification information to at least one user interface for use in performing the management operations.

14. A method for retrieving and provisioning device identification information using a Baseboard Management Controller (BMC) device, comprising:

retrieving, by a device management subsystem that is provided by a Baseboard Management Controller (BMC) device and that is connected to at least one device component via a device communication interface that is not accessible by a host management subsystem that is provided by the BMC device and that is connected to at least one host component via a host communication interface, device component identification information from each of the at least one device component via the device communication interface;

providing, by the device management subsystem, the device component identification information to the host management subsystem, retrieving, by the host management subsystem, host component identification information from each of the at least one host component via the host communication interface; and providing, by the host management subsystem, the device component identification information and the host component identification information for management operations.

15. The method of claim 14, wherein the host communication interface is an Inter-Integrated Circuit (I2C) interface, and the device communication interface is a Universal Serial Bus—Network Interface Controller (USB-NIC) interface.

16. The method of claim 14, wherein the host component identification information and the device component identification information are each provided by Field Replaceable Unit (FRU) information.

17. The method of claim 14, wherein the at least one device component includes a plurality of Graphics Processing Units (GPUs) that are included on a circuit board.

18. The method of claim 17, further comprising:

retrieving, by the device management subsystem, the device component identification information from each of the plurality of GPUs via the device communication interface and from a controller that is included on the circuit board and coupled to each of the plurality of GPUs.

19. The method of claim 14, further comprising:

providing, by the host management subsystem, the device component identification information and the host component identification information to at least one inventory consumer application for use in performing the management operations.

20. The method of claim 14, further comprising:

providing, by the host management subsystem, the device component identification information and the host component identification information to at least one user interface for use in performing the management operations.

* * * * *